(12) United States Patent
Lehureau (10) Patent No.: US 6,778,669 B1
(45) Date of Patent: Aug. 17, 2004

(54) QUANTUM ENCRYPTION DEVICE

(75) Inventor: Jean-Claude Lehureau, Sainte Genevieve des Bois (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/448,453

(22) Filed: Nov. 24, 1999

(30) Foreign Application Priority Data

Nov. 24, 1998 (FR) .............................................. 98 14787

(51) Int. Cl.$^7$ .......................... H04K 1/00; H04K 1/10
(52) U.S. Cl. ........................... 380/256; 380/41; 380/33
(58) Field of Search ..................... 380/41, 256

(56) References Cited

U.S. PATENT DOCUMENTS

| | | |
|---|---|---|
| 3,913,076 A | 10/1975 | Lehureau et al. |
| 3,919,698 A | 11/1975 | Bricot et al. |
| 3,971,002 A | 7/1976 | Bricot et al. |
| 4,023,033 A | 5/1977 | Bricot et al. |
| 4,025,784 A | 5/1977 | Lehureau et al. |
| 4,037,251 A | 7/1977 | Bricot et al. |
| 4,038,524 A | 7/1977 | Puech et al. |
| 4,039,764 A | 8/1977 | Bricot et al. |
| 4,059,841 A | 11/1977 | Bricot et al. |
| 4,079,247 A | 3/1978 | Bricot et al. |
| 4,079,248 A | 3/1978 | Lehureau et al. |
| 4,128,309 A | 12/1978 | Lehureau et al. |
| 4,138,663 A | 2/1979 | Lehureau et al. |
| 4,139,263 A | 2/1979 | Lehureau et al. |
| 4,142,208 A | 2/1979 | Oprandi et al. |
| 4,143,402 A | 3/1979 | Bricot et al. |
| 4,171,879 A | 10/1979 | Bricot et al. |
| 4,176,277 A | 11/1979 | Bricot et al. |
| 4,199,783 A | 4/1980 | Huignard et al. |
| 4,203,133 A | 5/1980 | Bricot et al. |
| 4,275,275 A | 6/1981 | Bricot et al. |
| 4,275,428 A | 6/1981 | Lehureau |
| 4,308,545 A | 12/1981 | Lehureau et al. |
| 4,321,634 A | 3/1982 | Lehureau |

(List continued on next page.)

OTHER PUBLICATIONS

U.S. patent application Ser. No. 09/448,453, Lehureau, Nov. 24, 1999.
U.S. patent application Ser. No. 10/399,038, Lehureau, Apr. 17, 2003.
P. D. Townsend, et al., "Single Photon Interference In 10 km Long Optical Fibre Interferometer," Electronic Letters, vol. 29, No. 7, (Apr. 1, 1993), pp. 634–635.
A. Muller, et al., "Experimental Demonstration of Quantum Cryptography Using Polarized Photons in Optical Fibre Over More Than 1 km," Europhysics Letters, vol. 23. No. 6, (Aug. 20, 1993), pp. 383–388.

*Primary Examiner*—Gilberto Barrón
*Assistant Examiner*—Kambiz Zand
(74) *Attorney, Agent, or Firm*—Oblon, Spivak, McClelland, Maier & Neustadt, P.C.

(57) ABSTRACT

A quantum encryption device comprises a transmitter and a receiver between which an encrypted piece of information is transmitted. The transmitter comprises at least means to send a first packet of photons and an information photon to the receiver, the appearance of the information photon following the packet being lagged by a period of time τ according to a law of probability. The transmitter also comprises means for the encoding of the information photon. The receiver comprises at least means for the encoding of a second packet of photons coming from the first packet and substantially lagged by the period of time τ with respect to this packet, and interference means to make an information photon interfere with the second packet of photons. These interference means provide a packet of photons to create a quantity of photons substantially equal to ±2 times the variance of the noise due to the second packet. The invention can be applied to the industrial-scale making of encryption systems.

17 Claims, 4 Drawing Sheets

U.S. PATENT DOCUMENTS

| | | | |
|---|---|---|---|
| 4,334,300 A | | 6/1982 | Arquie et al. |
| 4,380,016 A | | 4/1983 | Lehureau et al. |
| 4,381,556 A | | 4/1983 | Bourdon et al. |
| 4,405,862 A | | 9/1983 | Bricot et al. |
| 4,405,994 A | | 9/1983 | Cornet et al. |
| 4,551,733 A | | 11/1985 | Cornet et al. |
| 4,566,092 A | | 1/1986 | Gerard et al. |
| 4,586,165 A | | 4/1986 | Cornet et al. |
| 4,791,514 A | | 12/1988 | Huijer et al. |
| 4,827,218 A | | 5/1989 | Meunier et al. |
| 4,942,490 A | | 7/1990 | Lehureau |
| 4,949,198 A | | 8/1990 | Huijer et al. |
| 5,025,341 A | | 6/1991 | Bousquet et al. |
| 5,050,027 A | | 9/1991 | Meunier et al. |
| 5,067,230 A | | 11/1991 | Meunier et al. |
| 5,089,923 A | | 2/1992 | Lehureau |
| 5,124,869 A | | 6/1992 | Lehureau |
| 5,125,052 A | | 6/1992 | Lehureau et al. |
| 5,134,516 A | | 7/1992 | Lehureau et al. |
| 5,157,641 A | | 10/1992 | Lehureau |
| 5,168,485 A | | 12/1992 | Lehureau et al. |
| 5,172,368 A | | 12/1992 | Lehureau |
| 5,182,781 A | | 1/1993 | Lehureau et al. |
| 5,218,595 A | | 6/1993 | Lehureau et al. |
| 5,229,874 A | | 7/1993 | Lehureau et al. |
| 5,243,649 A | * | 9/1993 | Franson .................. 380/256 |
| 5,272,551 A | | 12/1993 | Lehureau et al. |
| 5,307,410 A | * | 4/1994 | Bennett .................. 380/256 |
| 5,311,592 A | * | 5/1994 | Udd ........................ 380/256 |
| 5,337,172 A | | 8/1994 | Lehureau |
| 5,347,380 A | | 9/1994 | Lehureau |
| 5,349,400 A | | 9/1994 | Kaplan et al. |
| 5,392,181 A | | 2/1995 | Lehureau et al. |
| 5,396,482 A | | 3/1995 | Lehureau |
| 5,459,619 A | | 10/1995 | Colineau et al. |
| 5,515,438 A | * | 5/1996 | Bennett et al. ........... 380/278 |
| 5,566,982 A | | 10/1996 | Lehureau et al. |
| 5,657,304 A | | 8/1997 | Lehureau |
| 5,659,536 A | | 8/1997 | Maillot et al. |
| 5,671,106 A | | 9/1997 | Lehureau |
| 5,675,648 A | * | 10/1997 | Townsend ................ 380/278 |
| 5,745,329 A | | 4/1998 | Lehureau |
| 5,757,912 A | * | 5/1998 | Blow ...................... 380/256 |
| 5,764,765 A | * | 6/1998 | Phoenix et al. .......... 380/283 |
| 5,801,794 A | | 9/1998 | Lehureau et al. |
| 5,872,764 A | | 2/1999 | Lehureau et al. |
| 5,880,914 A | | 3/1999 | Lehureau |
| 5,936,484 A | | 8/1999 | Dolfi et al. |
| 5,973,890 A | | 10/1999 | Lehureau et al. |

* cited by examiner

QUANTUM ENCRYPTION DEVICE

BACKGROUND OF THE INVENTION

The present invention relates to a quantum encryption device. It can be applied especially to the production of encryption systems on an industrial scale.

There are known ways of making transmission lines protected against indiscreet listening by using the properties of quantum uncertainty. A sender, commonly known as Alice, sends a message to a receiver, commonly called Bob, in form of discrete quantum states. If an eavesdropper, usually called Eve, intercepts and measures these states, Alice and Bob can make carry out checks, on a public means, on the action introduced by Eve's measurement. Furthermore, through a play of random diagonal bases, it can be shown that the channel available to Alice a posteriori, namely after transmission, through a public means, of the bases used for transmission, has a capacity greater than the capacity available to Eve a priori. In other words, quantum encryption plays on the impossibility of observing two persons by sharing a code. A quantum code is therefore used to define an encryption code by using properties of non-observation which mean, essentially, that Alice cannot share the code with Bob. Quantum encryption consists especially of the transmission of information by isolated photons to which an encoding is applied. One problem especially is to be able to detect these isolated photons.

The quantum phenomena used are generally in the field of optics, because it is in this field that the quantum phenomena are most observable. Thus, there are known systems in which the quantum state used is the polarization or phase of a photon on an optical line. Such systems require a very high quality detector to give a reasonable chance of detecting the unique photons that convey the information elements. These detectors are complex to make and costly. In fact, they are not suited to industrial-scale and mass applications such as for example business transactions using electronic and/or optical channels. For example, CCD cameras of the large-scale consumer type has a noise level of about 30 to 300 photons. It is therefore not capable of detecting a few photons. By contrast, laboratory CCD cameras designed for example for astronomical applications are capable of carrying out dissociations at the photon level, but do so at the cost of extremely complex and costly modes of implementation. In particular, by construction, the CCD cameras cannot or can hardly go below a noise level in the range of ambient temperatures. This can easily be shown by a few known relationships and variables. If Q is the minimum electrical charge that a CCD camera can detect and C the capacitance of its detection components, these two parameters Q and C verify the following relationship:

$$\frac{Q^2}{C} = kT \quad (1)$$

where kT is substantially equal to $0.4 \cdot 10^{-20}$ Joules at ambient temperature.

Furthermore, the capacitance C is in the range of $10^{-13}$ F., and therefore the above-mentioned charge Q will be substantially equal to $2 \cdot 10^{-17}$ Cb, giving about 120 times $1.6 \cdot 10^{-19}$ Cb, this latter charge corresponding to the electrical charge of a photon. At ambient temperature, a CCD detector cannot detect less than 120 photons approximately. The square root of the number of photons represents the noise of the detector. It is of course possible to reduce this noise by increasing the complexity especially of the detection by known correlation functions. However, the remaining noise level is always appreciably greater than a few photons, unless we go to very low temperatures, which is feasible neither industrially nor economically. Other types of detectors such as for example PIN diode detectors or avalanche detectors have similar detection characteristics.

SUMMARY OF THE INVENTION

A main aim of the invention is to enable the making of a quantum encryption device using detectors and amplifiers that are standard devices, hence low-priced and available in the market. To this end, an object of the invention is a quantum encryption device comprising a transmitter and a receiver between which an encrypted piece of information is transmitted, wherein the transmitter comprises at least:

means to send a packet of photons and an information photon to the receiver, the appearance of the information photon following a law of probability s and being lagged with respect to the packet by a period of time τ;

means for the encoding of the information photon; and wherein the receiver comprises at least:

means for the encoding of a second packet of photons coming from the first packet and lagged substantially by the period of time τ with respect to this first packet;

interference means to obtain the interference of an information photon with the second packet of photons, the interference means providing a packet of photons to create a quantity of photons substantially equal to ±2 times the variance a of the noise due to the second packet.

BRIEF DESCRIPTION OF THE DRAWINGS

The main advantages of the invention are that it can be adapted to several types of information encoding bases, can be adapted to all types of optical links and is simple to implement.

Other characteristics and advantages of the invention shall appear from the following description made with reference to the appended drawings, of which.

MORE DETAILED DESCRIPTION

Figure 1:
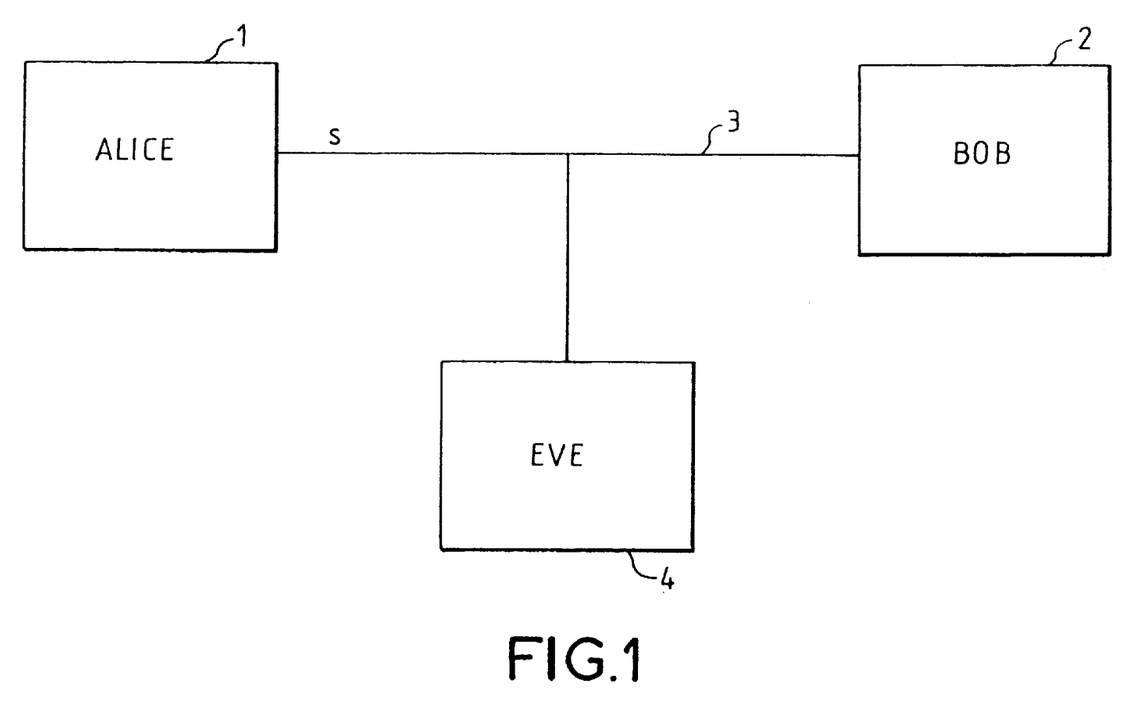
FIG. 1 is an illustration of the elements present during an encrypted transmission operation.

FIG. 1 illustrates the elements present in encrypted transmission operations. One of the known principles of quantum encryption consists especially of the sending by the transmitter 1, Alice, of isolated photons subjected for example to a phase encoding along two diagonal orientation encoding bases, for example (0:0°, 1:180°) and (0:90°, 1:270°). The messages are decoded by the receiver 2, Bob, randomly along either of the two bases. A message decoded according to the right base, that of transmission, corresponds to a total correlation, namely to a received bit. If it is decoded on a base that is diagonal to the transmission base, the received information is zero. After the sending of the message, the transmitter 1 sends the receiver 2 a piece of information on the sequence of the bases that it is using. The receiver compares the transmission bases with the decoding bases and validates all the bits decoded according to the same base. The receiver must ascertain that no piece of information has been transmitted on the decodings that appear as diagonal between transmission and reception. This verification makes it possible especially to confirm the absence of an indiscreet eavesdropper on the message transmission channel 3. Indeed, a spying device 4, Eve, connected to the channel 3, can seek to mask its presence by sending additional information and, not knowing the base used by the receiver 2, may accurately retransmit information generated from the redundancy of the transmission without knowing that Alice 1 was making an encoding, according to a diagonal orientation base, of a signal sent by Eve 4 and received by Bob 2.

Hereinafter, the quantity of photons of a transmitted signal is denoted as s. For the sending of a bit by the transmitter 1, this bit being associated with a photon, s actually represents the probability that this bit will contain a piece of information, s is therefore smaller than 1. The scale of the difficulty of detecting the presence of a photon using low-cost industrial means has been shown here above. To enable the use of industrial-scale means, for example a CCD detector at ambient temperature, the invention proposes an approach to detect the information bits from the fluctuation of a large number of photons. This number of photons is at least greater than the noise level of the detection means. To this end, according to the invention, apart from the means of transmission of a small quantity of photons conveying an encoded signal, the transmitter 1 has means for the transmission of a very large quantity of photons. This quantity is referenced $p^2$ hereinafter and is called a main packet.

The modulus of the illumination E received by the receiver 2 is equal to the square root of the number of photons received. In other words, $E=\sqrt{p^2}$, where $p^2$ is the number of photons received. To add up the values of the illumination received, firstly from the $p^2$ photons and secondly from the s photons of the information signal, and given that these are quadratic numbers, the following relationship must be used:

$$|p+s|^2 = |p|^2 + |s|^2 + 2sp \quad (2)$$

if the photon is in phase with the main packet, where:

$$|p-s|^2 = |p|^2 + |s|^2 - 2sp \quad (3)$$

if the photon is in phase opposition with the main packet.

For example, it is possible to take $p^2=10^6$, actually a smaller number of photons $p^2$, but one that is close to the saturation of a CCD detector. In the presence of pieces of information s equal to 1, the illumination received is therefore equal to $10^6$ +1 ±2000. The fluctuation ±2000 is far greater than the noise of a standard CCD detector at ambient temperature which corresponds for example to a maximum quantity of about 300 photons. It can be seen therefore that the signal derived from the arrival of a photon in phase or in phase opposition is equal to ±2 times the variance of the noise due to the arrival of the main packet. In particular, if we look at the signal-to-noise ratio, in considering this fluctuation, namely ±2sp, we must take account of the noise provided by the $p^2$ photons which is a Schottky type noise whose value corresponds to p. The signal-to-noise ratio $$\frac{S}{B} = \frac{2sp}{\sqrt{b^2 + p^2}} \quad (4)$$

where b represents the noise of the detector. It is then always possible to increase the value of p, namely the number $p^2$ of photons sent to make $b^2$ negligible before $p^2$. In this case:

$$\frac{S}{B} = \frac{2sp}{p} = 2s \quad (5)$$

In the event of a signal where s=1, the signal-to-noise ratio is such that detection is possible. In particular, if we take the number of photons, namely:

$$\frac{S^2}{B^2} = 4s^2 \quad (6)$$

This means especially that the amplitude of a signal at the reception of a photon is greater than the amplitude of the Schottky noise by 6 dB.

Figure 2A:
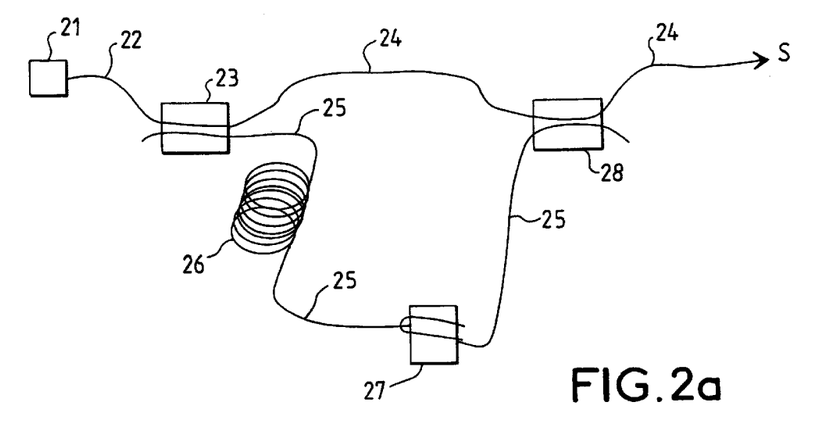
FIGS. 2a and 2b are possible embodiments of the transmitter and receiver of a device according to the invention.
Figure 2B:
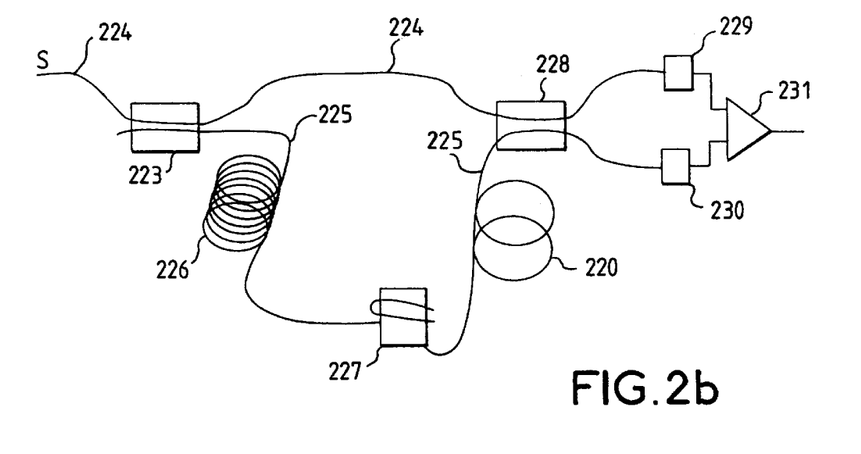

FIGS. 2*a* and 2*b* illustrate a possible embodiment of a device according to the invention. FIG. 2*a* shows an exemplary embodiment of the transmitter 1 and FIG. 2*b* shows an exemplary embodiment of the receiver 2. According to what is indicated here above, the transmitter 1 has means to send a packet of photons to enable the receiver 2 to display a single photon. In terms of light, this photon corresponds to light reduced to a quantum level with which a high-power, coherent light packet is associated. Furthermore, two diagonal orientation information-encoding bases are associated for example with this very low level of light, namely this single photon, it being known that one photon conveys one bit. To this end, the transmitter 1 comprises for example a coherent light pulse generator laser 21. The quality of coherence means for example that, with the transmission band having a width B and a pulse having a duration T, the term BT is substantially equal to 1 or in the range of 1. More generally, it means that the passband of the transmitter is linked to the small width of a pulse which may be for example about 1 ns, the passband then being about 1 GHz. The signals are sent by an optical link 22 which for example may be an optic fiber. For reasons of facility of description, it will be considered hereinafter that this link is an optic fiber. The laser 21 sends a very large number of photons. It sends for example a packet comprising about $10^8$ photons, relating to every bit sent, whether or not this bit contains information. Again facility of description, it shall be considered hereinafter that the laser 21 sends $10^8$ photons.

The transmitter 1 has a first coupler 23, for example with very low coupling coefficient. The packet of photons sent by the laser 21 enters this first coupler 23. A first optical fiber 24 emerges from the coupler 23. This fiber 24 is for example the same as the incoming fiber 22. This optical fiber 24 comprises almost the totality of the incoming photons. It can therefore be assumed that it still has about $10^8$ photons. A second optical fiber 25 comes out of the coupler 23. The coupling of this fiber 25 with the first fiber 22, 24 is for example obtained by twisting the two fibers together. The second optical fiber 25 has only a few photons. This fiber 25 comprises for example delay means 26. These means 26 are designed for the lagging, by a given period of time, of the few photons of the fiber 25 with respect to the packet of photons of the first fiber 24. The delay is for example in the range of one or more light pulses, hence for example in the range of one to several tens of nanoseconds. The delay means 26 are for example formed by a winding or coiling of the second fiber 25 in order to extend its length by a few meters with respect to the first fiber 24. The second optical fiber 25 then takes a route going by a phase modulator 27. The modulator encodes the phase of the photons according to either of the two bases of diagonal orientation. If it encodes a photon according to the first base (0°, 180°), the phase of the photon takes the value 0° or 180°. If it encodes a photon according to the second base (90°, 270°), the phase of the photon takes the value 90° or 270°. In other words, two photons are encoded according to the same base if they have a phase-shift of 0° modulo 180° between themselves, and they are encoded according to the diagonal orientation bases if they have a phase shift of 90° modulo 180° between themselves. The encoding is done randomly. To this end, the transmitter comprises means for the random control of the modulator. These means generate for example random digital words. These words are stored by storage means in order to be transmitted to the receiver 2. The transmission of these codes to the receiver may be done by optical means, for example by the same link as the one that transmits the photons or by any other means, for example RF means. The phase modulator 27 is for example a small piezoelectric cylinder around which the optical fiber 25 is wound.

Figure 3:
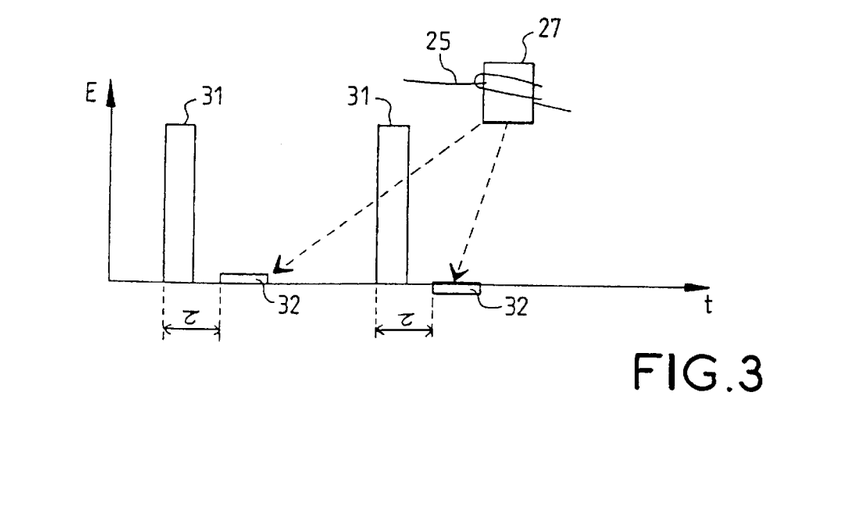
FIG. 3 is an illustration of exemplary quantities of photons brought into play in the direct channels and delayed channels of the transmitter of the device according to the invention.

FIG. 3 gives an exemplary illustration of the effect produced by the delay means 26 as well as the effect produced by the phase modulator 27. The quantities of photons 31, 32 respectively conveyed on the first optical fiber 24 and on the second optical fiber 25 are shown in a system of axes, the y axis representing the quantities of photons or the light amplitude E and the x axis representing the time t. The delay τ between the packet of photons 31, conveyed by the first optical fiber 24, and the few photons 32, conveyed by the second optical fiber 25, makes it possible to distinguish these photons from the packet 31. Furthermore, a first set of some photons 32 is encoded according to a first base and a second set of some photons 32 is encoded according to the diagonal orientation base. This second set therefore has an amplitude in phase opposition with the first set, especially characterized by the fact that in FIG. 3, the two sets 32 are on each side of the x axis.

At output of the modulator 27, the second optical fiber 25 is once again coupled to the first optical fiber 24 by means of a second coupler 28, for example with very low coupling. The output fiber of the second coupler is for example always the first optical fiber 22, 24. Given the very low coupling, it always has the packet of about $10^8$ photons and, delayed by the delay τ, it has a fraction of a photon, i.e. for example the probability s that it will comprise one photon is below 1, for example 10%. To arrive at this rate of probability from the main packet given by the laser 21, the two couplers have for example coupling rates of the order of 1/30,000. The link constituted by the first optical fiber 24 may be called a direct channel of the transmitter while the link constituted by the second optical fiber 25 may be called a delayed channel. The signal at output of the transmitter, namely in fact at output of the second coupler, may furthermore be represented by FIG. 3, where the large packet of photons 31 is for example in the range of $10^8$ and where, delayed by τ, there are no longer a few photons but a "fraction of a photon", namely in fact a probability of the existence of photons for example in the range of 10%. Indeed, as shown in FIG. 2a, it can clearly be seen that the delayed pulse is phase modulated and then reinjected into the direct channel 24 by the second coupler 28 with a very low coupling coefficient, for example as indicated here above. Consequently, the pulse delayed at output of the transmitter has a mean energy value that is far lower than that of a photon. The level of attenuation of the delay pulse is therefore such that the probability of the presence of two photons in this pulse is very small.

Preferably, as described here above, the delay channel 25 carries out encoding operations by playing on the phase, especially because the existence of a photon is associated, from the quantum point of view, with its phase. However, it is possible to provide for encoding means according to diagonal orientation bases that bring other parameters into play, especially on polarization. Two photons are then encoded according to diagonal bases if their polarizations are orthogonal. In this case, the phase modulator 27 is replaced for example by a polarizer that polarizes the photons according to either of the polarization bases (0:H, 1:V) and (0:$\sigma^+$, 1:$\sigma^-$) where H, V, $\sigma^+$ and $\sigma^-$ respectively represent the horizontal, vertical, left circular and right circular polarizations.

FIG. 2b shows a possible embodiment of the reception part 2 of a device according to the invention. The signal S received by the receiver 2 is the signal S transmitted by the transmitter. This signal S comprises a large packet of photons, for example $10^8$ photons, and possibly one photon containing an information bit delayed by τ. The length between the transmitter 1 and the receiver 2 is an optical link constituted for example by one or more series-connected optical fibers. The signal S penetrates the receiver 2, for example by an optical fiber 224, which is for example the same optical fiber as the fiber 24 that comes out of the transmitter. The receiver is described hereinafter with optical fiber links. However, other optical links may be considered. The receiver comprises a first coupler 223 with low coupling coefficient, for example in the range of 1/100. This coupler is made for example in a manner similar to the couplers 23, 28 of the transmitter. The coupler 223 couples the first optical fiber 224 with a second fiber 225. The coupling between these two fibers is greater than that between the optical fibers of the transmitter. They are for example twisted with each other over a greater length. The essential part of the intensity of the light pulses received is, however, transmitted to a second coupler 228, a 50/50 coupler, connected to the output of the first coupler 223 for example by means of the incoming fiber 224. This link between the first coupler 223 and the second coupler 228 is called a direct channel of the receiver. A very small part of the light pulses received is shunted into the second optical fiber 225, called the delayed channel of the receiver.

The delayed channel 225 comprises delays means 226 made for example in the same way as those of the transmitter and producing substantially the same delay τ. The delayed channel conveys a small part of the incoming signal into the receiver. However, the coupling coefficient of the coupler 223 is appreciably higher than that of the couplers 23, 28 of the transmitter, so that the quantity of photons flowing through the delayed channel is relatively great to constitute a packet of photons, for example in the range of one million units. At output of the delay means 226, the delayed channel comprises a phase modulator 227 that carries out a phase encoding of the packets of photons on the two abovementioned diagonal bases, but produces for example only 0° and 90° phase-shifts, especially to place the detection phase at 0° or 90°. These phases are for example generated by a linear random signal which is itself generated by means present in the receiver and not shown. At output of the modulator 227, the delayed channel comprises for example means 220 for the restitution of the polarization. Indeed, in an optical fiber, it may be that the polarizations of the waves fluctuate as a function of the temperature, whence the possible usefulness of the means of restitution of polarization which actually enable the maximizing of the contrast in the interferences between the direct channel and the delayed channel. At output of the restitution means, the second fiber 225 enters the second coupler 228. This coupler 228 is for example connected at output to two detectors, the input of a first detector 229 being connected to the direct channel 224 and the input of a second detector 230 being for example connected to the delayed channel 225. These detectors are for example connected to the optical fibers of the direct and delayed channels. The modulator 227 is for example made in the same way as the modulator 27 of the transmitter.

Figure 4:
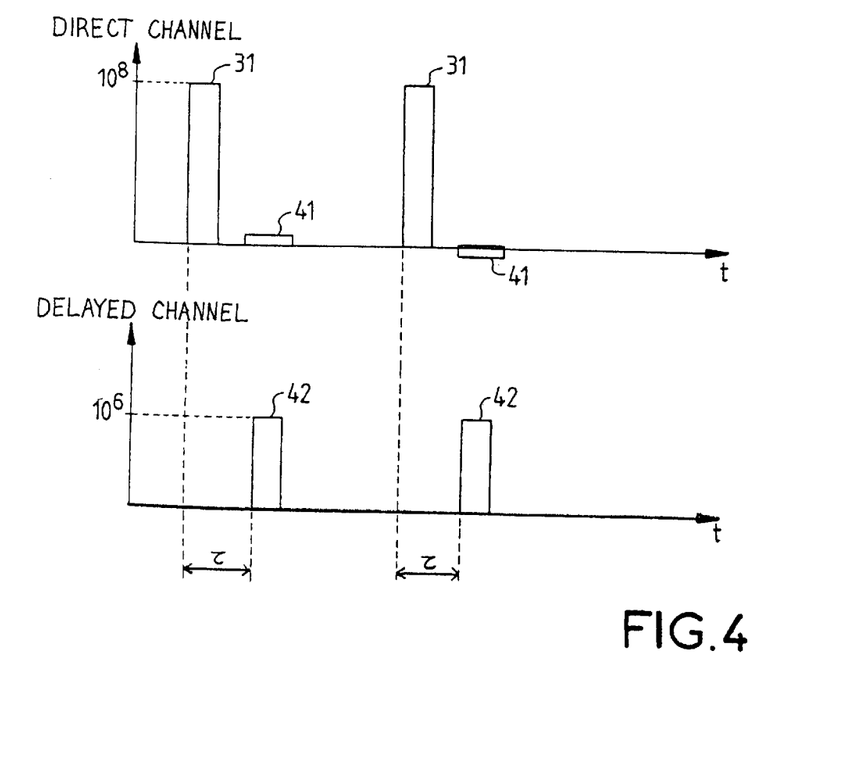
FIG. 4 is an illustration of examples of quantities of photons brought into play in the direct and delayed channels of the receiver of a device according to the invention.

FIG. 4 gives an illustration, in a first system of axes analogous to those of FIG. 3, of the balance of the signals present at the input of the second coupler 228, namely the 50/50 coupler. Given the low coupling coefficient of the first coupler 223 of the receiver, this balance is substantially the same as the balance of the signals at input of this first coupler, namely in fact the balance at output of the transmitter. On the direct channel 224, there therefore appears the big packet of photons 31, or more specifically a succession of big packets 31 already illustrated by FIG. 3. To facilitate the description, values have been set by way of examples. Thus, the big packet 31 has about $10^8$ photons. The direct channel furthermore has the delayed pulses 41, delayed by τ with respect to the big packets 31. The level of these delayed pulses 41 with respect to the pulse 32 of the delayed channel 25 of the transmitter is further diminished, especially by the second coupler 28 of the transmitter. As indicated here above, a delayed pulse has for example a probability of appearance s of about 10%.

In a second system of axes similar to the previous one, FIG. 4 represents the balance of the signals of the delayed channel 225 of the receiver, at input of the second coupler. This channel comprises packets of photons 42, delayed by τ with respect to the big packets 31. To put it in specific terms, given that the coupling coefficient of the first coupler 223 of the receiver is for example 1/100, the packets 42 present on the delay channel comprise for example $10^6$ photons. The delayed pulses 41 which are actually information photons, allowing for a probability s, may be in phase opposition from one recurrence to another, according to their encoding, like the pulses 32 of the delayed channel of the transmitter. This is why two successive information photons 41 are shown on each side of the x axis in FIG. 4. The big packets 42 have the same delay τ as the information photons 41 with respect to the big packets 31. As a result, the second coupler 228, namely the 50/50 coupler, causes an information photon 41 passing through the direct channel to interfere with the packet of photons 42 passing through the delayed channel. The 50/50 coupler may be replaced by another type of interferometer or interference means.

Figure 5:
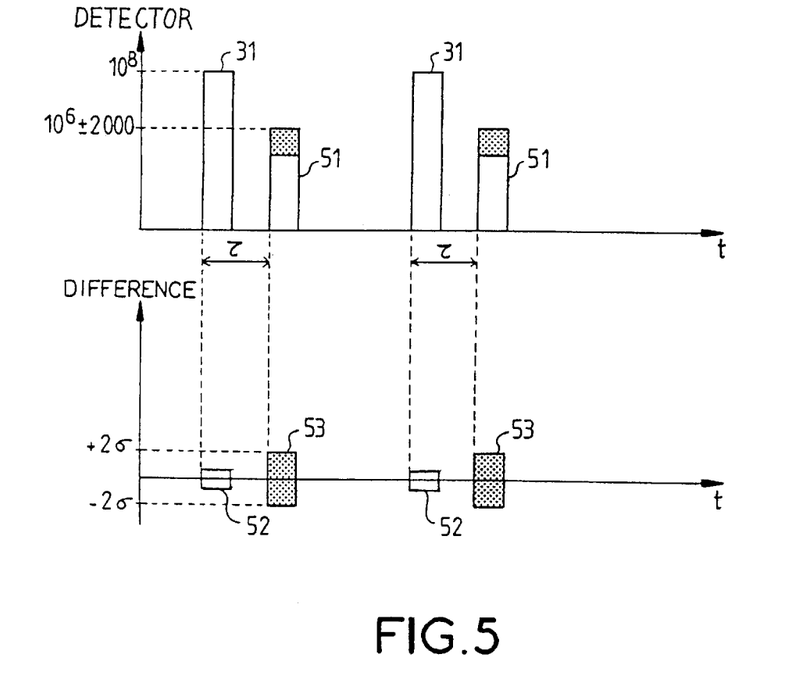
FIG. 5 is an exemplary illustration of quantities of photons detected at output of a device according to the invention.

FIG. 5 provides an illustration, in a first system of axes similar to the previous ones, of the signals at input of a detector 229, 230 placed at output of the 50/50 coupler. A detector receives the signals from the direct channel, namely the big packets 31, followed by the information photons which interfere with the packet 42 of the delayed channel. The interference of an information photon 41 with a packet 42 of the delayed channel gives, delayed by τ with respect to a big packet 31, a quantity 51 of photons set up in accordance with the above relationships (2) and (3). If we remain with the quantities fixed here above as examples, the quantity of photons present at the second input of the detector 229 is therefore substantially equal to $10^6 \pm 2000$. More generally, the quantity of photons present at this second input is substantially equal to the quantity of photons of the packet 42 of the delayed channel 225±twice the variance σ of the noise due to the arrival of this packet. This interference therefore considerably amplifies the signal of an information photon by creating a quantity of photons equal to ± twice the variance σ. A detector 229, 230 may be a standard CCD detector or again a PIN diode detector or avalanche diode also known, that works at ambient temperature and is a low-cost device available in the market. The detection can therefore be done economically on an industrial scale.

Means 231 take, for example, the difference between the signals of the two detectors in such a way that they deliver quantities of photons as illustrated in the second system of axes of FIG. 5. These means, in particular, allow the appearance only of the photons related to the variance a, in taking into account the photons coming from the big packets. The difference between the big packets of photons results in a few hundreds of photons 52 corresponding to the noise of the detectors. With regard to the information photons, if no photon has been sent, which is actually the most probable situation, the number of photons detected on the difference channel is zero. However, the Schottky noise on each of the detectors 229, 230 generates a signal whose variance is σ. When a photon is sent but detected in phase quadrature, namely according to the code 90° or 270°, the signal distribution is not affected. When a photon is received in phase or in phase opposition, the quantity 53 of photons is shifted by a value of ±2 σ. The encoding of a photon is actually done a first time by the encoding means 27 of the transmitter and then a second time by the encoding means 227 of the receiver which encode the delayed packet 42 and therefore the information photon by the action of the interference of the 50/50 coupler. Comparison means not shown and placed at output of the difference means 231 comprise for example two thresholds $\pm S_0$ to enable an arbitrary definition of the fact that a signal has been received. This threshold is adjusted for example to maximize the entropy of the transmission channel between the transmitter and the receiver. In other words, the lower the probability of transmission of an information photon, the higher must the threshold $S_0$ be so as to minimize the errors due to the belief that a reception has occurred when nothing has been sent. Similarly, the increase in the threshold acts negatively by reducing the number of photons sent and actually detected. The transmitter Alice and the receiver Bob have memorized the bases according to which the signals have been sent and detected. Bob furthermore memorizes the situations where the number of photons detected is greater than the threshold $\pm S_0$ as well as the threshold-crossing sign. In a second phase, Alice sends Bob the base, for example the phase base, according to which the signals have been sent. Bob then identifies the signals that have given rise to a detection and have been transmitted and received according to the same base.

What is claimed is:

1. A quantum encryption device comprising a transmitter and a receiver between which an encrypted piece of information is transmitted, wherein the transmitter comprises at least:

means to send a first packet of photons and an information photon to the receiver, the information photon following a law of probability s and being lagged with respect to the packet by a period of time τ;

means for randomly encoding of the information photon according to diagonal base orientations;

and wherein the receiver comprises at least:
means for the encoding of a second packet of photons coming from the first packet and lagged substantially by the period of time τ with respect to this first packet;
interference means to obtain interference of the information photon received at the receiver with the second packet of photons, the interference means providing a packet of photons to create a quantity of photons substantially equal to ±2 times the variance σ of the noise due to the second packet.

2. A device according to claim 1, comprising:
first and second detectors placed at outputs of the interference means, an input of the first detector being linked to a direct channel of the receiver and an input of the second detector being linked to a delayed channel of the receiver;
a mechanism to take the difference between the outputs of the first and second detectors and allow an appearance of only the photons linked to the variance.

3. A device according to claim 1, wherein a detector is a detector working at ambient temperature.

4. A quantum encryption device comprising a transmitter and a receiver between which an encrypted piece of information is transmitted, wherein the transmitter comprises at least:
means to send a first packet of photons and an information photon to the receiver, the information photon following a law of probability s and being lagged with respect to the packet by a period of time τ;
means for randomly encoding of the information photon according to diagonal base orientations;
and wherein the receiver comprises at least:
means for the encoding of a second packet of photons coming from the first packet and lagged substantially by the period of time τ with respect to this first packet;
interference means to obtain interference of the information photon received at the receiver with the second packet of photons, the interference means providing a packet of photons to create a quantity of photons substantially equal to ±2 times the variance σ of the noise due to the second packet, wherein the transmitter comprises:
a laser generating the first packet of photons;
a first coupler into which the packet of photons enters;
a second coupler connected by a first input and by a direct optical channel to an output of the first coupler and receiving the greatest part of the input signal of this coupler;
a delayed channel connecting the second output of the first coupler to the second input of the second coupler, this delayed channel comprising means to create the delay τ and the encoding means, these means encoding photons that travel through this delayed channel, an output of the second coupler giving the signal to be transmitted to the receiver.

5. A device according to claim 4, wherein the couplers have a very low coupling coefficient.

6. A device according to claim 4, wherein the encoding means carry out a phase encoding according to two bases of diagonal orientation, a base with 0°, 180° orientation and a base with 90°, 270° orientation.

7. A device according to claim 4, wherein the direct optical channel is an optical fiber.

8. A device according to claim 4, wherein the delayed optical channel comprises an optical fiber.

9. A device according to claim 4, wherein the delay means comprise an optical fiber winding.

10. A device according to claim 4, wherein the encoding means comprise a phase modulator comprising a small piezoelectric cylinder around which an optical fiber is wound.

11. A quantum encryption device comprising a transmitter and a receiver between which an encrypted piece of information is transmitted, wherein the transmitter comprises at least:
means to send a first packet of photons and an information photon to the receiver, the information photon following a law of probability s and being lagged with respect to the packet by a period of time τ;
means for randomly encoding of the information photon according to diagonal base orientations:
and wherein the receiver comprises at least:
means for the encoding of a second packet of photons coming from the first packet and lagged substantially by the period of time τ with respect to this first packet;
interference means to obtain interference of the information photon received at the receiver with the second packet of photons, the interference means providing a packet of photons to create a quantity of photons substantially equal to ±2 times the variance σ of the noise due to the second packet, wherein the receiver comprises:
a first coupler receiving the signal sent by the transmitter;
an interferometer linked by a first input and by a direct optical channel to an output of the first coupler and receiving the greatest part of the input signal from this coupler;
a delayed channel connecting the second output of the first coupler to the second input of the interferometer, this delayed channel comprising means to create the delay τ and means for the encoding of the photons that travel through this delayed channel;
at least one detector connected to the output of the interferometer.

12. A device according to claim 11, wherein the first coupler has a coupling coefficient greater than the coupling coefficients of the couplers of the transmitter.

13. A device according to claim 11, wherein the encoding means carry out a 0° or 90° phase encoding.

14. A device according to claim 11, wherein the direct optical channel is an optical fiber.

15. A device according to claims 11, wherein the delayed optical channel comprises an optical fiber.

16. A device according to claim 11, wherein the delayed channel comprises means, at output of the encoding means, to restitute the polarization.

17. A quantum encryption device comprising:
a transmitter and a receiver between which an encrypted piece of information is transmitted;
said transmitter configured to send a first packet of photons and an information photon to the receiver, the information photon following a law of probability s and being lagged with respect to the packet by a period of time τ;
said transmitter comprising an encoder configured to randomly encode the information photon according to diagonal base orientations;
said receiver comprising,
an encoding mechanism configured to encode of a second packet of photons coming from the first packet and lagged substantially by the period of time $\tau$ with respect to this first packet, and an interference device configured to obtain interference of the information photon received at the receiver with the second packet of photons, the interference device providing a packet of photons to create a quantity of photons substantially equal to ±2 times the variance $\sigma$ of the noise due to the second packet.

* * * * *